United States Patent
Lopez Avila et al.

(10) Patent No.: US 10,405,621 B2
(45) Date of Patent: Sep. 10, 2019

(54) COLLAPSIBLE, LIGHTWEIGHT CONTAINER FOR SORTING AND DELIVERY OF PACKAGED ITEMS

(71) Applicant: Amazon Technologies, Inc., Seattle, WA (US)

(72) Inventors: Luis Armando Lopez Avila, Seattle, WA (US); Stephen Michael Sanchez, Seattle, WA (US); Edward McGavin, Indianola, WA (US); Ayush Goel, Seattle, WA (US); Hany Abdul-Hafez Elkordy, Sammamish, WA (US); David Henry Clark, Bellevue, WA (US); Hari Kumar Rajendran, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 478 days.

(21) Appl. No.: 15/186,829

(22) Filed: Jun. 20, 2016

(65) Prior Publication Data

US 2017/0280841 A1 Oct. 5, 2017

Related U.S. Application Data

(60) Provisional application No. 62/318,430, filed on Apr. 5, 2016.

(51) Int. Cl.
*B65D 33/02* (2006.01)
*A45C 7/00* (2006.01)
(Continued)

(52) U.S. Cl.
CPC ............ *A45C 7/0077* (2013.01); *A45C 13/04* (2013.01); *A45C 13/103* (2013.01);
(Continued)

(58) Field of Classification Search
CPC ..... A45C 7/0077; A45C 13/04; A45C 13/103; A45C 2013/1015; B65D 21/086; B65D 37/00; G06Q 10/00
(Continued)

(56) References Cited

U.S. PATENT DOCUMENTS

D372,344 S 7/1996 Alexis
D398,082 S 9/1998 Martz
(Continued)

FOREIGN PATENT DOCUMENTS

GB 2445144 7/2008

OTHER PUBLICATIONS

PCT/US2017/023233 , "International Search Report and Written Opinion", dated Aug. 4, 2017, 19 pages.
(Continued)

*Primary Examiner* — J. Gregory Pickett
*Assistant Examiner* — Niki M Eloshway
(74) *Attorney, Agent, or Firm* — Kilpatrick Townsend & Stockton LLP

(57) ABSTRACT

A container is described, which may be used as part of item sortation within a facility, as well as item deliveries to end locations. In an example, the container may be configured to transition between a collapsed state and an expanded state. The container may include a loading panel and an unloading panel. The loading panel may include a fastener such that an opening can be selectively created and closed in the expanded state. Accordingly, packaged items may be inserted and securely retained in the container through the loading panel. The unloading panel may also include a fastener such that an opening can be selectively created and closed in the expanded state. Accordingly, the packaged items may be unloaded from the container through this opening. The container may also be dimensioned to facilitate
(Continued)

stowage of the container in the collapsed state and loading/unloading of packaged items in the expanded state.

20 Claims, 9 Drawing Sheets

(51) Int. Cl.
    *A45C 13/04* (2006.01)
    *A45C 13/10* (2006.01)
    *B65D 21/08* (2006.01)
    *B65D 37/00* (2006.01)
    *G06Q 10/00* (2012.01)
    *B65D 30/06* (2006.01)

(52) U.S. Cl.
    CPC .......... *B65D 21/086* (2013.01); *B65D 37/00* (2013.01); *G06Q 10/00* (2013.01); *A45C 2013/1015* (2013.01)

(58) Field of Classification Search
    USPC .......... 220/9.2, 9.3; 211/10, 85.17; 224/580
    See application file for complete search history.

(56) References Cited

U.S. PATENT DOCUMENTS

| | | | |
|---|---|---|---|
| D398,083 S | 9/1998 | Martz | |
| 6,105,804 A * | 8/2000 | Stoffer | B65D 77/061 |
| | | | 200/511 |
| D444,271 S | 6/2001 | Farrugia | |
| D465,649 S * | 11/2002 | Sharples | A45C 5/06 |
| | | | D3/279 |
| D558,406 S | 12/2007 | King | |
| 8,047,391 B2 * | 11/2011 | Lu | A01K 1/03 |
| | | | 220/4.28 |
| D660,585 S | 5/2012 | Henck et al. | |
| 8,955,704 B2 * | 2/2015 | Kwon | B65D 7/28 |
| | | | 220/9.2 |
| D724,792 S | 3/2015 | Hanson et al. | |
| D728,167 S | 4/2015 | Hanson et al. | |
| D746,584 S | 1/2016 | McDonald | |
| D753,347 S | 4/2016 | Lu | |
| D762,059 S | 7/2016 | Kliot | |
| D768,981 S | 10/2016 | Kliot | |
| 9,796,080 B2 * | 10/2017 | Lindbo | B65G 1/1378 |
| 2008/0179205 A1 | 7/2008 | Anthony | |
| 2009/0223872 A1 * | 9/2009 | Robbins | B07C 3/00 |
| | | | 209/3.3 |
| 2010/0158752 A1 * | 6/2010 | Friderich | A61L 2/26 |
| | | | 422/27 |
| 2010/0191615 A1 * | 7/2010 | Thomas | B61D 3/20 |
| | | | 705/26.1 |
| 2011/0174811 A1 * | 7/2011 | Sabounjian | D06F 95/002 |
| | | | 220/9.2 |
| 2013/0087424 A1 * | 4/2013 | Pratt | A45C 13/04 |
| | | | 190/107 |
| 2014/0367304 A1 | 12/2014 | Kawano | |
| 2016/0227908 A1 * | 8/2016 | Deioma | A45C 13/02 |
| 2017/0225601 A1 * | 8/2017 | Borders | B60P 1/52 |

OTHER PUBLICATIONS

U.S. Appl. No. 14/868,682, U.S. Patent Application, filed Sep. 29, 2015, Titled: Planning of Transportation Requests.
U.S. Appl. No. 15/151,959, U.S. Patent Application, filed May 11, 2016, Titled: Flexible and Scalable Last Mile Delivery.
U.S. Appl. No. 29/560,311, U.S. Patent Application, filed Apr. 5, 2016, Titled: Sortation and Delivery Bag.
PCT/US2017/023233 , "Invitation to Pay Additional Fees and Partial Search Report", dated Jun. 13, 2017, 14 pages.
PCT/US2017/023233 , "International Preliminary Report on Patentability", dated Oct. 18, 2018, 11 pages.

* cited by examiner

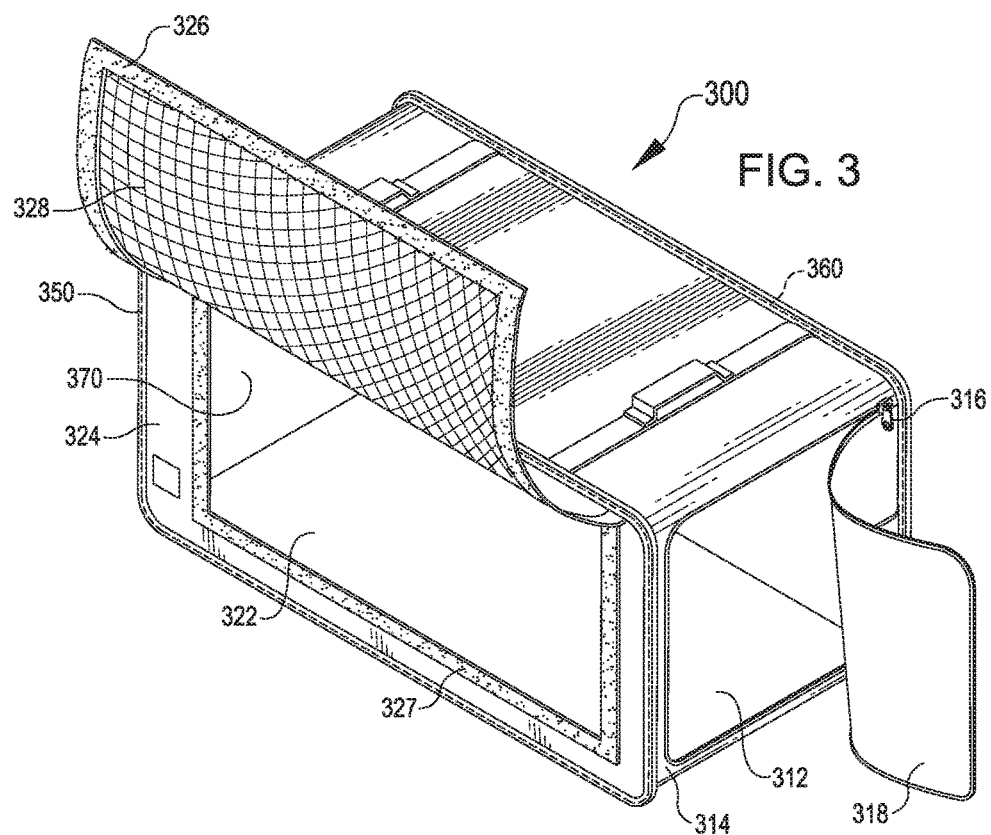
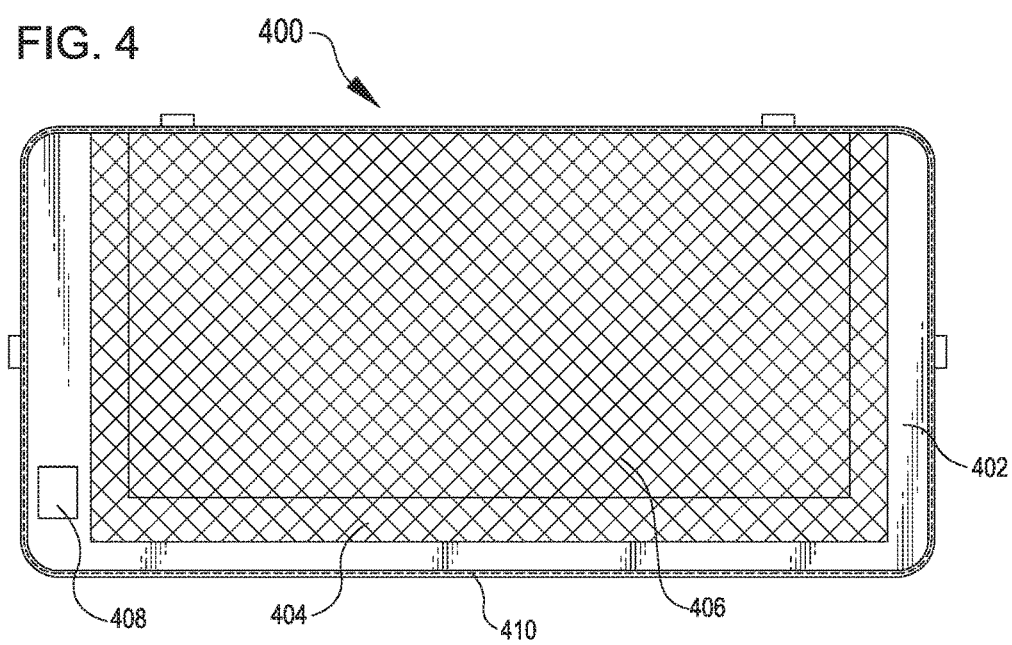

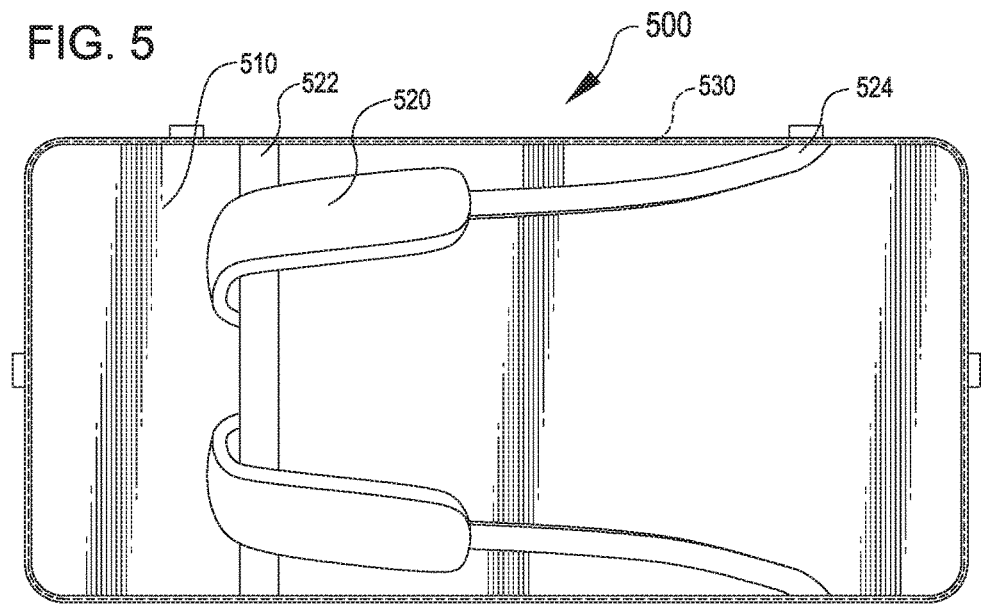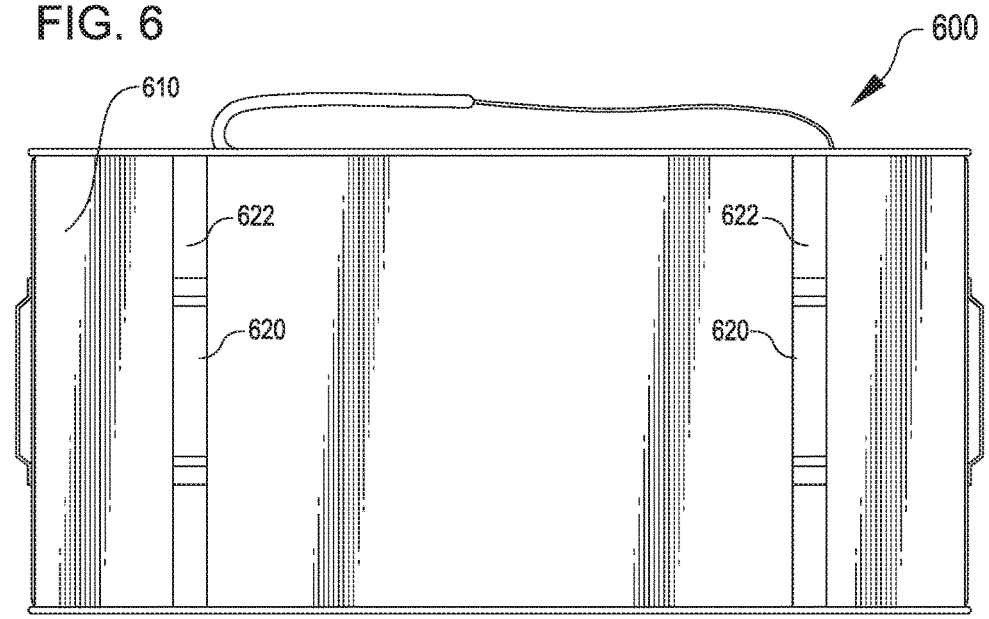

COLLAPSIBLE, LIGHTWEIGHT CONTAINER FOR SORTING AND DELIVERY OF PACKAGED ITEMS

CROSS REFERENCE TO RELATED APPLICATIONS

This application is a non-provisional application claiming priority to U.S. Provisional Application No. 62/318,430, filed Apr. 5, 2016, the contents of which are herein incorporated by reference in its entirety.

BACKGROUND

More and more users and entities are turning to online services for day-to-day activities. Many of the services span both the digital world and the physical world. For example, an entity may manage an electronic platform. The electronic platform may provide a web site that lists items for sale. The entity may also manage a storage facility. In turn, a user may operate a computing device and access the web site to purchase an item. The user may specify a delivery destination. The item may be delivered from the storage facility to the delivery destination.

Generally, the delivery of the item may involve transportation from a sortation facility to an end destination. At least a portion of that transportation leg may be referred to as the last mile delivery. At the sortation facility, packaged items may be sorted and accordingly placed into delivery containers. Delivery couriers operating vehicles may transport the delivery containers and deliver the packaged items to the end destinations.

Typically, the delivery containers may have a rigid and/or bulky design. The design may enable safe retention and transportation of packaged items throughout the last mile delivery. However, the design may also be heavy, occupy a same physical space regardless if a delivery container is full or empty, and be usable in only a limited number of delivery vehicle types.

BRIEF DESCRIPTION OF THE DRAWINGS

FIG. 3 illustrates an isometric view of a container in an expanded state, according to embodiments of the present disclosure.

FIG. 4 illustrates a front view of an example unloading panel of a container, according to embodiments of the present disclosure.

FIG. 5 illustrates a back view of an example back panel of a container, according to embodiments of the present disclosure.

FIG. 6 illustrates a top view of an example top panel of a container, according to embodiments of the present disclosure.

DETAILED DESCRIPTION

Figure 1:
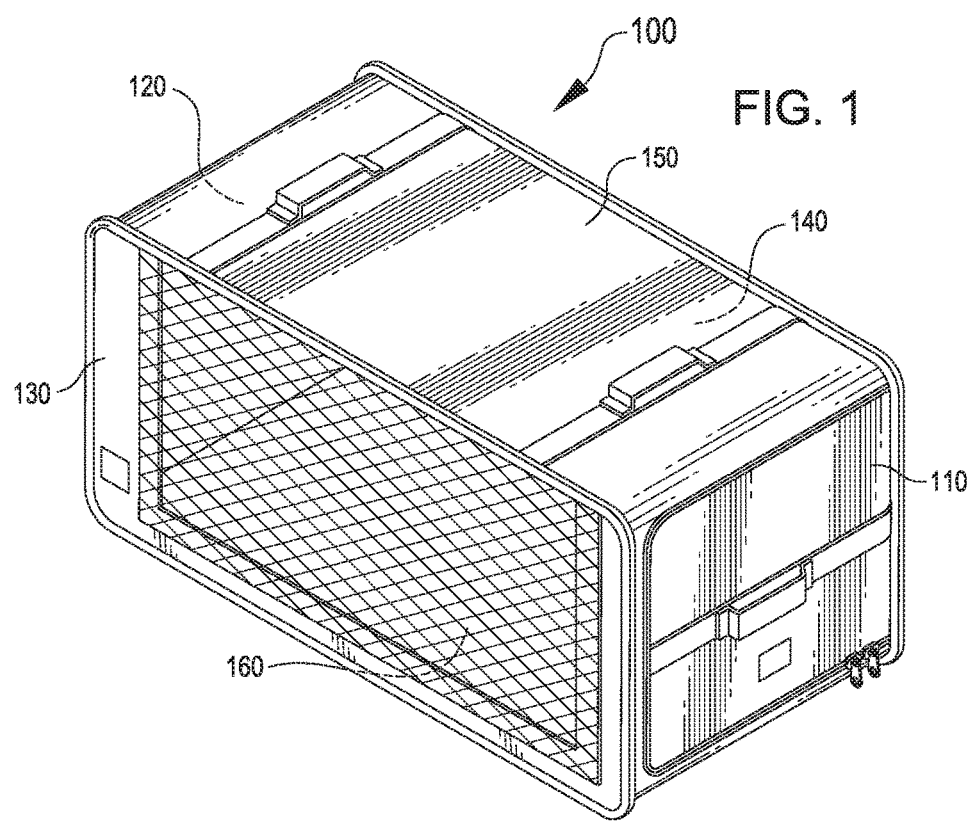
FIG. 1 illustrates an isometric view of a container that may be collapsible and lightweight, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a collapsible and lightweight container for containing packaged items. Such a container may be available throughout a delivery process, including in the last mile delivery. For instance, the container may be used at a sortation facility to contain packaged items and throughout the delivery of the packaged items from the sortation facility to end destinations.

In an example, the container may include a number of panels. Each panel may be made of a flexible, soft, and/or lightweight material. The panels may be arranged to form boundaries of an interior volume of the container and to transition between a collapsed state and an expanded state. In the collapsed state, the interior volume may be reduced, thereby facilitating stowage of the container. For instance, if the container is empty, the panels may be collapsed such that the collapsed container may occupy a relatively small or minimum stowage volume. In the expanded state, the interior volume may be increased to contain packaged items. The panels may also be dimensioned to meet stowage and operational design criteria and ergonomic criteria. For instance, the dimensions may be defined to meet a particular stowage volume when the container is collapsed and to meet a particular compartment volume when the container is expanded. The compartment volume may correspond to a volume reserved at a sortation facility for holding the container in the expanded state and loading packaged items into the interior volume. The compartment volume may also be common to a volume available across various types of delivery vehicles such that the container, in the expanded state, may be used across a diverse delivery fleet. Ergonomically, the dimensions may be defined to enable handling by a single operator while also supporting an acceptable or maximum weight and/or containing a number of packaged items.

In addition to the panels, the container may include a number of other components to support the collapsed and expanded states. For instance a number of frames (e.g., two frames) may be distributed across a number of panels (e.g., two different panels). A number of folding members (e.g., one folding member) may be attached to a number of panels (e.g., to one panel) and may be located within the interior volume. Depending on the relative arrangement of the frame(s) and the folding member(s), the panels may be permitted to transition between the collapsed and expanded states or may be constrained from transitioning out of the expanded state.

Loading packaged items into the interior volume may use various components of the container. For instance, one of the panels may include a flap and a fastener and may be referred to as a loading panel. The fastener may be operated to unfasten an edge of the flap and create an opening in the loading panel. The packaged items may be loaded through the opening. Thereafter, the fastener may be operated to refasten the edge of the flap and close the opening, thereby safely retaining the loaded packages in the interior volume.

Unloading packaged items from the interior volume may also use various components of the container. In an example, a different set of components than the one of the loading panel may be available. For instance, one of the panels may also include a flap and a fastener and may be referred to as an unloading panel. The fastener may be operated to unfasten an edge of the flap and create an opening in the unloading panel. The loaded packages may be removed through the opening. Thereafter, the fastener may be operated to refasten the edge of the flap and close the opening.

The relative locations of the loading and unloading panels and the type of flaps and fasteners may meet operational design criteria and ergonomic criteria. For instance, the two panels may have an adjoining edge, may be opposite to each other, or may be at other desired locations of the container.

To illustrate, consider an example of a substantially rectangular container that has six surfaces. Each surface may correspond to a panel of the container. The loading panel may be located at the right side of the container. The unloading panel may be located at a front side of the container. Each of the remaining panels may be a continuous panel that may not include a flap or support a re-sealable opening. The loading panel may include a base portion, a loading flap, and a zipper fastener. The zipper fastener may releasably attach the loading flap with the base portion. The zipper fastener can be opened to expose an opening for loading packaged items into an interior volume of the container through the loading panel. In comparison, the unloading panel may include a base portion, a hook and loop fastener, and an unloading flap. The unloading flap may include a mesh portion. The hook and loop fastener may releasably attach the unloading flap with the base portion. The hook and loop fastener may be detachable to release the unloading flap from the base portion permitting the unloading of the packaged items from the interior volume through the unloading panel. In addition, the unloading panel may include a frame within a channel around the base portion. The panel opposite to the unloading panel may include a similar frame. A folding member, such as a pad, may be located in the interior volume between the two frames. In one arrangement, the folding member may engage both frames (or, similarly, both panels), such that the panels may be constrained from transitioning out of an expanded state. In another arrangement, the folding member may disengage at least one of the frames (or, similarly, one of the panels), such that the panels may transition to a collapsed state. In addition, the panels may be dimensioned such that, even in the expanded state, virtually any economy car may have sufficient volume to hold the container.

The collapsible and lightweight container may provide improvements over existing delivery containers. For example, by using flexible material and arrangements of frame(s) and folding member(s), the container may be collapsed, thereby reducing the stowage volume. Hence, use of volume at a sortation facility or within a delivery vehicle may be improved. In another example, by using flexible and lightweight material, the ergonomics of delivery containers may be improved. This may translate into an opportunity of a single operator handling the container. In addition, by dimensioning for facilitating loading in a sortation facility, and unloading in a delivery vehicle, the container may be usable in different sortation facilities and across a diverse fleet of delivery vehicles.

Although different embodiments are described herein in connection with loading and unloading panels, other panel configurations and/or other number of panels may be used to load and unload packaged items. For example, the unloading panel may be additionally or alternatively used for the loading. In such a case, the loading panel may not be used or may be replaced with a plain panel (e.g., the loading panel may not be implemented as part of a container). Similarly, the loading panel may be additionally or alternatively used for the unloading.

Generally, a packaged item may refer to an item that may be included in a package or that on its own may not need additional packaging for delivery. A package may include a box, a bag, or any other enclosures that may be made of cardboard, plastic, and/or other packaging materials.

FIG. 1 illustrates an isometric view of a container 100 that may be collapsible and lightweight. In particular, FIG. 1 illustrates the container 100 in an expanded state. In the expanded state, the container 100 may have a substantially rectangular shape and thus, may include six panels corresponding to six surfaces. In the interest of clarity of explanation, the various panels may be referred to as a right panel 110, a left panel 120, a front panel 130, a back panel 140, a top panel 150, and a bottom panel 160. Right, left, front, back, top, and bottom may follow the orientation of the isometric view. As shown in FIG. 1, the container 100 may be free-standing when resting on the bottom panel 160, either empty or full. However, other positioning of the container 100 and/or orientations or labeling of the panels' locations may be possible. For instance, the container 100 may be positioned in an upright position resting on the left panel 120, where the right panel 110 may become a top panel. In this example, the container 100 may be free-standing when resting on the left panel 120, either empty or full. Additionally, the container 100 may be free-standing when resting on the top panel 150 or the right panel 110, either empty or full.

The container 100 may be configured to meet particular design criteria. The design criteria may relate to stowage, transportation, operation, and/or ergonomics criteria. Dimensions, materials, and layouts of components of the container 100 may be selected to meet the criteria. In an example, the criteria may necessitate that the container 100 may work in cold environments of about 28 to 40° F. (about −2.2 to 4.4° C.) and hot environments of about 80 to 120° F. (about 26.7 to 48.9° C.) and that no deterioration may occur from direct exposure to sunlight and heat. In an example, the criteria may necessitate that the empty container 100 may not exceed a maximum weight within the range of one to five pounds (about 0.45 to 2.26 kg) and that may be capable of carrying a maximum weight of packaged items within the range of twenty-five to seventy-five pounds (about 11.34 to 34 kg). In an example, the criteria may include fabric material tear strength criteria, such as to ASTM D2261-02 and/or other relevant standards (e.g., ISO standards), and an abrasion resistance criteria, such as ASTM D4966-04 and/or other relevant standards (e.g., ISO standards). In an example, the criteria may necessitate that a loading panel of the container 100 may remain open during a loading operation and that the bag may be collapsible over another panel (e.g., an unloading panel). In an example, the criteria may also necessitate a frame made of a particular material and size (e.g., a metal frame of a gauge four) and particular attachment of the frame to a panel (e.g., metal frame sewn into a fabric of the panel). Configuring the container 100 to meet these criteria is described herein next and in the next figures.

As illustrated in FIG. 1, the right panel 110 may correspond to a loading panel. Details of the loading panel are further described in connection with FIGS. 3 and 8. Generally, the loading panel may include a configuration of different components to support one or more re-sealable openings. A packaged item may be loaded through a re-sealable opening of the right panel 110.

Opposite to the right panel 110, a left panel 120 may be a plain panel that may not include re-sealable openings. Thus, the left panel 120 may be an impermeable panel. The container 100 may be positioned to sit-up with the left panel 120 being in contact with a ground surface. Details of the left panel 120 are further described in connection with FIG. 9.

In between the right panel 110 and the left panel 120, a front panel 130 may exist. An edge of the front panel 130 may adjoin an edge of the right panel 110. Another edge of the front panel 130 may adjoin another edge of the left panel 120. In an example, the front panel 130 may correspond to an unloading panel. Details of the unloading panel are further described in connection with FIGS. 3 and 4. Generally, the unloading panel may include a configuration of different components to support one or more re-sealable openings. A packaged item contained in the interior volume of the container 100 may be unloaded from the container through a re-sealable opening of the front panel 130. In addition, a portion of the front panel 130 may not obstruct a view of the interior volume, even when the re-sealable opening(s) are sealed (e.g., closed). For instance, the portion may include a mesh panel.

Opposite to the front panel 130, a back panel 140 may be a plain panel that may not include re-sealable openings. Thus, the back panel 140 may be an impermeable panel. In an example, backpack or other carrying straps may be attached to the back panel 140. Details of the back panel 140 are further described in connection with FIG. 5.

Adjoined between edges of the panels 110-140, a top panel 150 may be a plain panel that may not include re-sealable openings. Thus, the top panel 150 may be an impermeable panel. Details of the top panel 150 are further described in connection with FIG. 6.

Opposite to the top panel 150, a bottom panel 160 may be a plain panel that may not include re-sealable openings. Thus, the bottom panel 160 may be an impermeable panel. Details of the bottom panel 160 are further described in connection with FIG. 7.

Although FIG. 1 illustrates a particular arrangement of the panels, other arrangements are similarly possible. For instance, while the right panel 110 may be a loading panel, the left panel 120, the back panel 140, the top panel 150, and/or the bottom panel 160 may be set as an unloading panel in addition or as an alternative to the right panel 110. Similarly, while the front panel 130 may be an unloading panel, the left panel 120, the back panel 140, the top panel 150, and/or the bottom panel 160 may be set as a loading panel in addition or alternative to the front panel 130.

Furthermore, although FIG. 1 illustrates a substantially rectangular container in an expanded state, other shapes may be possible. The shape may be a function of the panels, material of the panels, frames attached with the panels, and/or folding member(s) inside or outside of the container. Hence, a substantially cylindrical, pyramidal, conical, triangular prismatic, hexagonal prismatic, and/or other geometric shapes may be achieved based on particular arrangements and materials of the panels, and/or frames attached with the panels, and folding member(s).

Figure 2:
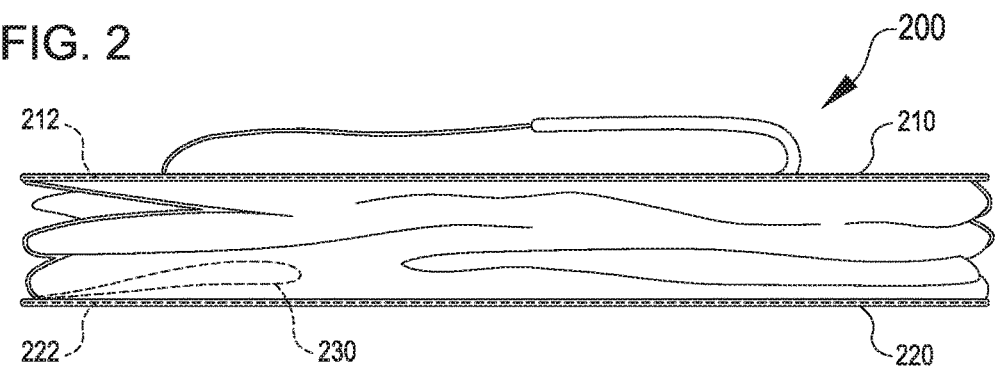
FIG. 2 illustrates a container in a collapsed state, according to embodiments of the present disclosure.

FIG. 2 illustrates an isometric view of a container 200 in a collapsed state. The container 200 may include some or all of the components of the container 100 described in connection with FIG. 1. In the collapsed state, two or more panels of the container 200 may sit substantially parallel to and on top of each other, while separated by a certain height distance. All of the other panels may be collapsed. For example, a plain panel 210 (e.g., one that may not include a re-sealable opening(s), such as the back panel 140 of FIG. 1) may sit substantially parallel to and on top of an unloading panel 220 (e.g., such as the front panel 130 of FIG. 1). In this example, all of the other panels but the plain panel 210 and the unloading panel 220 may be collapsed. The height of the container in the collapsed state may be in the range of, for example, one to three inches (about 2.54 to 7.62 cm). The height may correspond to the largest perpendicular intersection or distance between the two planes defined by the plain panel 210 and the unloading panel 220.

Other configurations for transitioning container 200 to the collapsed state may be possible. Generally, the transition may depend on arrangements of frame(s) and folding member(s). Panels not including frames may be collapsible. Panels including frames may not be collapsible. A folding member(s) may be located between non-collapsible panels to engage the non-collapsible panels in an expanded state and to disengage at least one of the non-collapsible panels for the transition to the collapsed state. Hence, as illustrated in FIG. 2, the plain panel 210 may include a frame 212. Likewise, the unloading panel 220 may include a frame 222. A folding member 230 may be located between the plain panel 210 and the unloading panel 220.

The frame 212 may attach with the plain panel 210 at a particular location. For instance, the frame 212 may be stitched or disposed within a channel that may run around the boundary of the plain panel 210. The boundary may be within the interior volume of the container 200. Other locations may also be possible. For instance, the boundary may be on the outside of the container 200. In another illustration, the frame 212 may, additionally or alternatively, run along a diagonal or the two diagonals of the plain panel 210. The frame 212 may form a closed loop (e.g., may be continuous such as not to have explicit ends) or may have breaks (e.g., may have multiple sub-portions, each portion being continuous or having respective ends). The frame 212 may also be made of a robust, lightweight material such as an appropriate metal or plastic tubing, piping or rod member.

The frame 222 may have a similar configuration as the frame 212 with respect to the unloading panel 220. Similarities are not repeated herein in the interest of clarity of explanation. Briefly, the frame 222 may be a mirror of the frame 212. Alternatively, the frame 222 may have a different configuration (e.g., a closed loop, whereas the frame 212 may have breaks).

The folding member 230 may be a relatively robust, lightweight member to provide support, such as a pad, padded cardboard, a padded or unpadded plastic, or a brace spacer. The folding member 230 may also be located within the interior volume or outside of the container 200. In an example, a fastener may attach the folding member 230 with at least one of the panels. The fastener may include stitching an edge or portion of the folding member 230 to an edge or portion of the respective panel, a hook and loop fastener, a zipper, a set of magnets, and/or other fasteners. As illustrated in FIG. 2, the folding member 230 may be attached to the unloading panel 220 while being free from the plain panel 210. In this example, an edge of the folding member 230 may be stitched to an edge of the unloading panel 220. In this example, the folding member 230 may fold towards the unloading panel 220 and away from the plain panel 210 in the collapsed state. However, an opposite configuration may be similarly possible, where the folding member 230 may attach with the plain panel 210 instead. In addition, the use of a fastener may not be needed. Instead, the folding member 210 may be freely inserted in between the two frames 212 and 222 in the expanded state and disengaged from the two frames 212 and 222 in the collapsed state. In this example, the folding member 230 may, but need not, be removed from the interior volume of the container 200 as part of the transition to the collapsed state.

In addition, one or more backpack or carrying straps 240 may attach with an exterior surface of one of the panels. As illustrated in FIG. 2, the backpack straps 240 may attach with the exterior surface of the plain panel 210.

FIG. 3 illustrates an isometric view of a container 300 in an expanded state. The container 300 may include some or all of the components of the containers 100 and 200 described in connection with FIGS. 1 and 2. In particular, FIG. 3 shows re-sealable openings 312 and 322 within panels of the container 300 to load and unload packaged items. Before describing the details of the re-sealable openings 312 and 322, an example arrangement of frames and a folding member is described. This arrangement follows the example arrangement described in connection with FIG. 2 with respect to the expanded state.

As illustrated, a frame 350 may be attached with a front panel of the container 300. Similarly, a frame 360 may be attached with a back panel of the container 300. A folding member 370 may be disposed between the front and back panels. In particular, the folding member 370 may engage the frame 350 and the frame 360 in the expanded state. Engaging with the frame 350 may include direct contact or indirect contact (e.g., through stitching or channel around a frame) between an edge of the folding member 370 and an edge of the frame 350 (e.g., the left, vertical boundary of the frame 350 running through the left, vertical edge of the unloading panel) or between points on the edge of the folding member 370 and points of an edge of the frame (e.g., points on the horizontal boundaries of the frame 350). Similar engagement may be possible between the folding member 370 and the frame 360. In an example, the folding member 370 may be dimensioned to enable the engagement in the expanded state. For instance, if the left panel of the container 300 (e.g., the panel to which the folding member 370 may be substantially parallel in the expanded state) is of a certain size (e.g., height and width), the folding member 370 may be designed to have a similar size (e.g., height and width). The similar size may be the same size, designed to account for a manufacturing tolerance and/or design margin. The tolerance or margin may vary between, for example, "±one or two percent."

Referring now to the re-sealable opening 312, that opening may be selectively opened and sealed within a loading panel (shown as the right panel of the container 300 and, in an example, corresponding to the right panel 110 of FIG. 1). The loading panel may include various components such as a base portion 314, a fastener 316, and a loading flap 318. Each of these components is described herein next in more detail.

In an example, the base portion 314 may extend around a boundary of the loading panel. For instance, the base portion 314 may have a first edge that may follow the boundary and a second edge at an offset distance from the first edge. The offset distance may be substantially the same across the entire boundary such that the second edge may be parallel to the first edge. Alternatively, the offset distance may vary across the boundary. In an example, the offset distance falls within a distance range. That distance range may be one eighth to five inches (e.g., about 0.32 to 12.7 cm). FIG. 3 illustrates a rectangular or square loading panel that includes four sides. The base portion 314 may span at least one of the sides. As illustrated in FIG. 3, the base portion 314 may include a flexible, lightweight material, such as a particular fabric, between the first and second edges along the top, left, and bottom sides of the boundary.

In an example, the fastener 316 may attach the loading flap 318 with the base portion 314. FIG. 3 illustrates a zipper fastener as an example of the fastener 316. Other fastener types may also be possible and may include a hook and loop fastener, a set of snaps or buttons, or a set of magnets. Regardless of the actual fastener type, the fastener 316 may attach an outer edge of the loading flap 318 to the second edge of the base portion 314. The attachment may be multi-sided. For instance, FIG. 3 illustrates a rectangular or square loading panel that includes four sides. The attachment may span at least one of the sides. As illustrated in FIG. 3, the attachment may be along the top, left, and bottom sides. In comparison, the right side of both the loading flap 318 and the base portion 314 may be integral to each other. In other words, the loading flap 318 may open to the right and pivot around the right, vertical edge of the loading panel. Other opening configurations may be similarly possible by varying the configuration of the base portion 314, the fastener 316, and the loading flap 318. For instance, the loading flap 318 may open to the top, horizontal edge, the left, vertical edge, the bottom, horizontal edge, and/or be completely removed from the loading panel.

In an example, the loading flap 318 may be entirely a plain, impermeable panel. However, the embodiments of the present disclosure may apply similarly to other configurations of the loading flap 318. For instance, the loading flap 318 may be partially or entirely made of a mesh. In either case, the loading flap 318 may be made of a lightweight, flexible, and collapsible material.

Referring now to the re-sealable opening 322, that opening may be selectively opened and sealed within an unloading panel (shown as the front panel of the container 300 and, in an example, corresponding to the front panel 130 of FIG. 1). The unloading panel may include various components such as a base portion 324, a fastener, and an unloading flap 328. Each of these components is described herein next in more detail.

In an example, the base portion 324 may extend around a boundary of the unloading panel. For instance, the base portion 324 may have a first edge that may follow the boundary and a second edge at an offset distance from the first edge. The offset distance may be substantially the same across the entire boundary such that the second edge may be parallel to the first edge. Alternatively, the offset distance may vary across the boundary. In an example, the offset distance falls within a distance range. That distance range may be one to ten inches (e.g., about 2.54 to 25.4 cm). FIG.

3 illustrates a rectangular or square unloading panel that includes four sides. The base portion 324 may span at least one of the sides. As illustrated in FIG. 3, the base portion 324 may include material of the unloading panel between the first and second edges along the right, bottom, and left sides of the boundary. The material may be lightweight, flexible, and collapsible.

In an example, the fastener may attach the unloading flap 328 with the base portion 324. FIG. 3 illustrates a hook and loop fastener made of two components: a first fabric component 326 and a second fabric component 327 that may mate with the first fabric component 326 (or vice versa). The first fabric component 326 may attach with an outer edge of the unloading flap 328 (e.g., through stitching). The second fabric component 327 may similarly attach with a second edge of the base portion 324. Other fastener types may also be possible and may include a zipper, a set of snaps or buttons, or a set of magnets. Regardless of the fastener type, the fastener may attach an outer edge of the unloading flap 328 to the second edge of the base portion 324. The attachment may be multi-sided. For instance, FIG. 3 illustrates a rectangular or square unloading panel that includes four sides. The attachment may span at least one of the sides. As illustrated in FIG. 3, the attachment may be along the right, bottom, and left sides. In comparison, the top side of both the unloading flap 328 and the base portion 324 may be integral to each other. In other words, the unloading flap 328 may open up and pivot around the top, horizontal edge of the unloading panel. Other opening configurations may be similarly possible by varying the configuration of the base portion 324, the fastener (e.g., the two fabric components 326 and 327), and the unloading flap 328. For instance, the unloading flap 328 may open to the right, vertical edge, the bottom, horizontal edge, the left, vertical edge, and/or be completely removed from the unloading panel.

In an example, the unloading flap 328 may include a mesh portion. The mesh portion may include a pattern or a number of holes or pores, such that content of the interior volume of the container 300 (e.g., any packaged items) may be visible to an external operator. However, the embodiments of the present disclosure may similarly apply to other configurations of the unloading flap 328. For instance, the unloading flap 328 may be entirely a plain, impermeable panel. In either case, the unloading flap 328 may be made of a lightweight, flexible, and collapsible material.

FIG. 4 illustrates a front view of an example unloading panel 400 of a container. The unloading panel 400 may correspond to the front panel 130 of FIG. 1. In an example, the unloading panel 400 may be substantially rectangular with contoured edges. However, other shapes may be possible. The unloading panel 400 may also be dimensioned such that the container may be used across a diverse fleet of delivery vehicles and/or for handling by a single operator. For instance, the height of the unloading panel 400 may fall within a relevant height range, such as between ten to twenty-five inches (about 25.4 to 63.5 cm). Similarly, the length of the unloading panel 400 may fall within a relevant length range, such as between thirty to fifty inches (about 76.2 to 127 cm). In an example, the height may be set at about eighteen inches (about 45.72 cm) and the length at about thirty-six and a half inches (about 92.71 cm). Such dimensions may enable usage in virtually any economy car and larger delivery vehicles and may meet various ergonomics criteria.

In an example, the unloading panel 400 may include a base portion 402. The base portion 402 may be made of, for example, 100% polyester fully drawn yarn, with a 1050D denier (5×210D FDY yarn), a 2×2 DOBBY—Basket Weave construction, a PU coating with two layers on one side finish, and a minimum weight with coating of about 7.02 oz/yd$^2$ (240 gsm). As illustrated, the base portion 402 may span the left, bottom, and right sides of the unloading panel 400.

In an example, the base portion 402 may include a placeholder for or may attach with a label 408. The label 408 may be a one or two dimensional barcode, a text label, a radio frequency identification (RFID) tag, or other label types that may encode information. The information may identify a geographical zone to which the container may be destined. The geographical zone may include a number of end locations for packaged items contained in the container.

As illustrated, the dimensions of the base portion 402 may vary across the unloading panel 400. For instance, on the right, vertical side of the unloading panel 400, the height of the base portion 402 may be substantially the same as the height of the unloading panel 400. However, the length may vary in a range between one half to five inches (about 1.27 to 12.7 cm). In an example, this length may be about two and a half inches (about 6.35 cm), including about a half of an inch (about 1.27 cm) of a fabric component of a hook and loop fastener.

The left, vertical side of the unloading panel 400 may have dimensions falling within similar dimension ranges as the right, vertical side. In comparison, on the bottom, horizontal side of the unloading panel 400, the length of the base portion 402 may be about the same as the length of the unloading panel 400 (e.g., falling in the range of thirty to fifty inches (about 76.2 to 127 cm)). The height of that bottom, horizontal side may fall in a height range of one half to five inches (about 1.27 to 12.7 cm).

In an example, the loading panel 400 may include a fastener 404. The fastener 404 may attach the base portion 402 with an unloading flap 406 of the loading panel 400. In an example, a nylon threaded, sew-on hook and loop fastener may form the fastener 404. The color may be black or gray. The dimensions of the fastener 404 may, but need not, be uniform across the unloading panel. For instance, the fastener 404 may have a length along the vertical sides and a height along the horizontal side that fall within a range of one fourth to three inches (about 0.635 to 7.62 cm).

The unloading flap 406 may include a mesh portion. In an example, the mesh portion may include holes having hexagonal shapes. The maximum diagonal within a hexagonal hole may vary between one sixty-fourth to one inch (e.g., about 0.04 to 2.54 cm). The mesh may be made of the same material and have the same finishing as the base portion 402. The mesh portion may extend to substantially cover the fastener 404, a portion of the fastener 404 (e.g., about half way in from an outer edge of the fastener 404) or to attach with the fastener through a plain, impermeable portion.

In an example, the unloading panel 400 may also include a frame 410. The frame 410 may be continuous and stitched to or run within a channel at the outer boundary of the unloading panel 400. In an example, the frame 410 may be made of a metal or plastic tube, pipe or rod of a gauge four.

FIG. 5 illustrates a back view of an example back panel 500 of a container. The back panel 500 may correspond to the back panel 140 of FIG. 1. In an example, the back panel 500 may be substantially opposite and parallel to the unloading panel 400 of FIG. 4. In this example, the back panel 500 may be rectangular with contoured edges and may have similar dimensions as the dimensions of the unloading panel 400 of FIG. 4.

In the illustration of FIG. 5, and unlike the unloading panel 400 of FIG. 4, the back panel 500 may not include a mesh portion. Instead, the back panel 500 may include a plain, impermeable portion 510. The plain, impermeable portion 510 may be made of the same material as the base portion 402 of the unloading panel 400 of FIG. 4. An outer surface of the plain, impermeable portion 510 may have a dark color, such as black or gray. An inner surface of the plain, impermeable portion 510 (e.g., one visible through the mesh portion 406 of the unloading panel 400 of FIG. 4) may be made of a bright or reflective color, such as orange. The bright color may facilitate a visual check of the interior volume of the container through the unloading panel.

In an example, the plain, impermeable portion 510 may include a number of backpack or carrying straps 520. The backpack strap(s) 520 may allow an operator (whether human or automated such as a robotic arm) to carry the container (e.g., on his or her back in the case of a human operator). A backpack strap may be made of padded nylon. FIG. 5 illustrates two backpack straps 520 oriented horizontally (in the view of FIG. 5) and attached with the plain, impermeable portion 510 via a number of fasteners. A different number of backpack straps may also be used instead. As illustrated, a fastener 522 may attach one end of a backpack strap with the plain, impermeable portion 510. Similarly, a fastener 524 may attach another end of a backpack strap with the plain, impermeable portion 510. The type of the fasteners 522 and 524 may, but need not, be the same. For instance, the attachment may be relatively permanent by way of double stitched nylon threads. In another illustration, the attachment may be relatively modular by way of a snap-in buckle fastener.

In an addition, the back panel 500 may also include a frame 530. The frame 530 may be continuous and stitched to or run within a channel at the outer boundary of the plain, impermeable portion 510. In an example, the frame 530 may be made of a metal or plastic tube, pipe or rod of a gauge four.

FIG. 6 illustrates a top view of an example top panel 600 of a container. The top panel 600 may correspond to the top panel 150 of FIG. 1. As illustrated, the top panel 600 may be rectangular with contoured edges and may have similar dimensions as the dimensions of the unloading panel 400 of FIG. 4.

In the illustration of FIG. 6, and similarly to the back panel 500 of FIG. 5, the top panel 600 may not include a mesh portion. Instead, the top panel 600 may include a plain, impermeable portion 610. The plain, impermeable portion 610 may be made of the same material as the plain, impermeable portion 510 of the back panel 500 of FIG. 5. An outer surface of the plain, impermeable portion 610 may have a dark color, such as black or gray.

In an example, the plain, impermeable portion 610 may include a number of handles 620. The handle(s) 620 may allow an operator (whether human or automated such as a robotic arm) to carry the container. A handle may be made of nylon and may have a length between a half inch to three inches (about 1.27 to 7.62 cm) and a height between two to five inches (about 5.08 to 12.7 cm). FIG. 6 illustrates handles 620 oriented vertically (in the view of FIG. 6) and attached with the plain, impermeable portion 610 via a number of fasteners. A different number of handles may also be used instead. As illustrated, a fastener 622 may attach each end of a handle with the plain, impermeable portion 610. The fastener 622 may run along the height of the plain, impermeable portion 610 and may have a length substantially the same as the length of the handle 620. Other handles may be similarly attached via respective fasteners. Different fastener types may be possible. For instance, the attachment via the fastener 622 may be relatively permanent by way of double stitched nylon threads. In another illustration, this attachment may be relatively modular by way of a snap-in buckle fastener.

Figure 7:
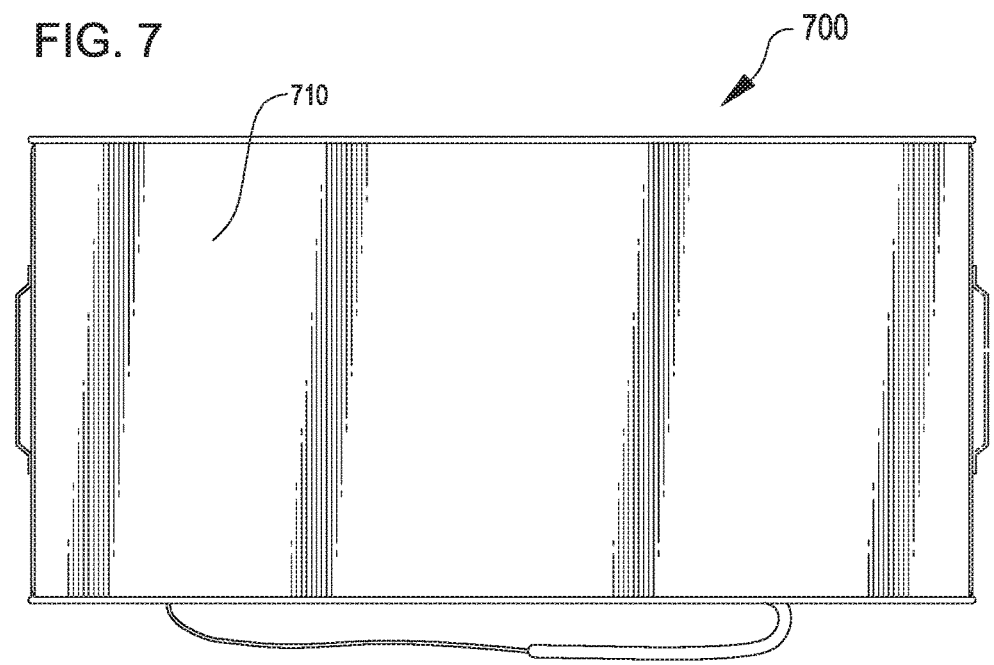
FIG. 7 illustrates a bottom view of an example bottom panel of a container, according to embodiments of the present disclosure.

FIG. 7 illustrates a bottom view of an example bottom panel 700 of a container. The bottom panel 700 may correspond to the bottom panel 160 of FIG. 1. In an example, the bottom panel 700 may be substantially opposite and parallel to the top panel 600 of FIG. 6. In this example, the bottom panel 700 may have rectangular shape with contoured edges and may have similar dimensions as the dimensions of the top panel 600 of FIG. 6.

In the illustration of FIG. 7, and similarly to the top panel 600 of FIG. 6, the bottom panel 700 may not include a mesh portion. Instead, the bottom panel 700 may include a plain, impermeable portion 710. The plain, impermeable portion 710 may be made of the same material as the plain, impermeable portion 610 of the top panel 600 of FIG. 6. Additionally, unlike the top panel 600 of FIG. 6, the bottom panel 600 may not include handles. Nonetheless, other configurations of the bottom panel 700 may be possible. For instance, a number of handles may attach with the plain, impermeable portion 710. In another illustration, the plain, impermeable portion 710 may be a mirror image of the plain, impermeable portion 610 of the top panel 600 of FIG. 6.

In an example, the bottom panel 700 may include a label (not shown in FIG. 7). Various positions and attachment of the label may be possible. For example, the label may be attached to an interior or exterior surface of the bottom panel 700 or may be embedded within the bottom panel 700. Similarly, the label may be positioned to be close to one edge of the bottom panel 700 relative to another edge. The label may include information about the container. For example, the label may include a unique identifier of the container, a date of manufacture, an expiration date (e.g., a date by which the container should no longer be used for containing, transporting, and delivery of packaged items), information about a use cycle (e.g., how many times the container may have been deployed for the delivery), and other container-related information. The label may be a one or two dimensional barcode, a text label, a RFID tag (active or passive), or other label types that may encode information.

Figure 8:
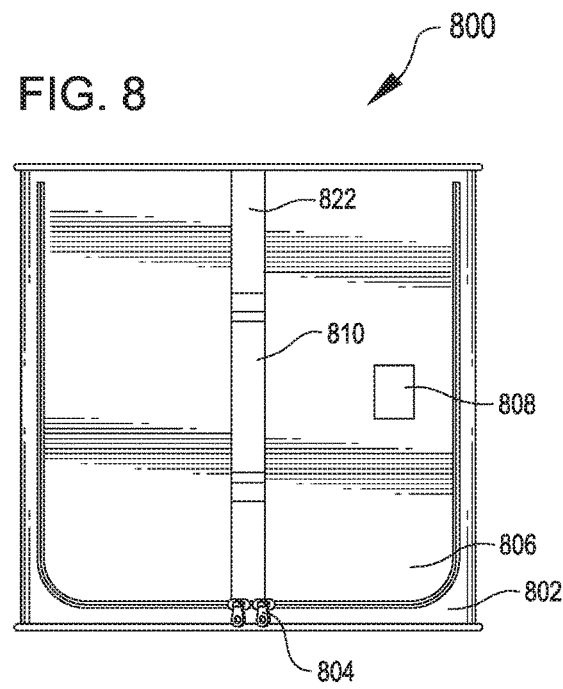
FIG. 8 illustrates a right view of an example loading panel of a container, according to embodiments of the present disclosure.

FIG. 8 illustrates a right view of an example loading panel 800 of a container. The loading panel 800 may correspond to the right panel 110 of FIG. 1. In an example, the loading panel 800 may be substantially square with contoured edges. However, other shapes may be possible. The loading panel 800 may also be dimensioned such that the container may be used across a diverse fleet of delivery vehicles and/or for handling by a single operator. For instance, the height and length of the loading panel 800 may fall within a relevant dimension range, such as between ten to twenty-five inches (about 25.4 to 63.5 cm). In an example, the height and length may be set at about eighteen inches (about 45.72 cm). Such a dimension may enable usage in virtually any economy car and larger delivery vehicles and may meet various ergonomics criteria.

In an example, the loading panel 800 may include a base portion 802. The base portion 802 may be made of, for example, substantially the same material as the material of the base portion 402 of the unloading panel 400 of FIG. 4. As illustrated, the base portion 802 may span the left, bottom, and right sides of the loading panel 800.

As illustrated, the dimensions of the base portion 802 may vary across the loading panel 800. For instance, on the right, vertical side of the loading panel 800, the height of the base portion 802 may be substantially the same as the height of the loading panel 800. However, the length may vary in a range between one fourth to two inches (about 0.635 to 5.08 cm). In an example, this length may be about half an inch (about 1.27 cm).

The left, vertical side of the loading panel 800 may have dimensions falling within similar dimension ranges as the right, vertical side. In comparison, on the bottom, horizontal side of the loading panel 800, the length of the base portion 802 may be about the same as the length of the loading panel 800 (e.g., falling in the range of ten to twenty-five inches (about 25.4 to 63.5 cm)). The height of that bottom, horizontal side of the loading panel 800 may fall in a height range of one fourth to two inches (about 0.635 to 5.08 cm). In an example, this height may be about half an inch (about 1.27 cm).

In an example, the loading panel 800 may include a fastener 804. The fastener 804 may attach the base portion 802 with a loading flap 806 of the loading panel 800. In an example, a dual zipper with a tape molded tooth may form the fastener 804. The color may be black or gray. The fastener 804 may, but need not, run across some or all of the sides of the loading panel 800. As illustrated, the fastener 804 may run parallel to the left, vertical side, the bottom, horizontal side, and the right, vertical sides of the loading panel 800. An offset may exist between an end of the fastener 804 along the left, vertical side and a top, horizontal side. A similar offset may also exist between another end of the fastener 804 along the right, vertical side and a top, horizontal side. Each offset may fall within an offset range of one fourth to two inches (e.g., about 0.0635 to 5.08 cm).

The loading flap 806 may include a plain, impermeable portion. This plain, impermeable portion may be made of the same material and have the same finishing as the base portion 802. As illustrated in FIG. 8, the plain, impermeable portion may cover the entire loading flap 806. However, the embodiments of the present disclosure may not be limited as such. Instead, the loading flap 806 may also include a mesh portion.

In an example, the loading flap 806 may include a placeholder for or may attach with a label 808. The label 808 may be a one or two dimensional barcode, a text label, a RFID tag, or other label types that may encode information. The information may identify a geographical zone to which the container may be destined. The geographical zone may include a number of end locations for packaged items contained in the container.

In an example, the loading flap 806 may also include a number of handles 810. The handles 810 may allow an operator (whether human or automated such as a robotic arm) to carry the container. A handle may be made of nylon and may have a length between one half to three inches (about 1.27 to 7.62 cm) and a height between two to five inches (about 5.08 to 12.7 cm). FIG. 8 illustrates a single handle 810 oriented vertically (in the view of FIG. 8) and attached with the loading flap 806 via a number of fasteners. A different number of handles may also be used instead. As illustrated, a fastener 812 may attach each end of a handle with the loading flap 806. The fastener 812 may run along the height of the loading flap 806 and may have a length substantially the same as the length of the handle 810. Other handles may be similarly attached via respective fasteners. Different fastener types may be possible. For instance, the attachment via the fastener 812 may be relatively permanent by way of double stitched nylon threads. In another illustration, this attachment may be relatively modular by way of a snap-in buckle fastener.

In a further example, when the container is an expanded state and the loading flap 806 is in an open position (e.g., the fastener 804 releasing the loading panel 806, such that the loading panel 806 is opened upward towards the top, horizontal side of the loading panel 800), a stiffener member may be introduced in or unfolded within the interior volume in proximity of the opening. The stiffening member may engage with opposing two panels adjoined to the loading panel 800 (e.g., with the frame 410 or base portion 402 of the unloading panel 400 of FIG. 4 and the frame 530 or the plain, impermeable portion 510 of the back panel 500 of FIG. 5). The stiffening member may constrain the opening such that the opening may not collapse (e.g., the loading panel 800 may not collapse and the unloading panel 400 and back panel 500 may remain at a predefined distance from each other). The predefined distance may correspond to the height and/or length of the loading panel 800 (e.g., eighteen inches (about 45.72 cm)). In an example, the stiffener member may be a padded bar made of a metal or plastic material that may have a similar height and/or length (or greater) as the height and/or length of the loading panel 800. The similar size may be the same size, designed to account for a manufacturing tolerance and/or design margin. The tolerance or margin may vary between, for example "±one or five percent." In another example, the stiffener member may be made of two engaging members that may engage with each other to form the stiffener member. In this example, each of the engaging members may have a height and/or length that may be about half the height and/or length of the loading panel 800.

Figure 9:
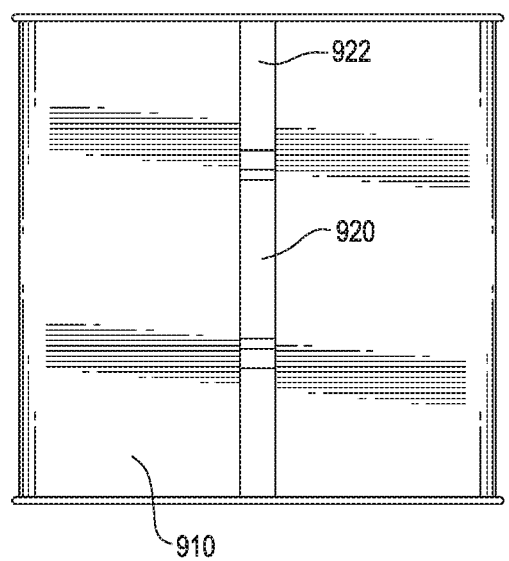
FIG. 9 illustrates a left view of an example left panel of a container, according to embodiments of the present disclosure.

FIG. 9 illustrates a left view of an example left panel 900 of a container. The left panel 900 may correspond to the left panel 120 of FIG. 1. In an example, the left panel 900 may be substantially opposite and parallel to the loading panel 800 of FIG. 8. In this example, the left panel 900 may have a square shape with contoured edges and may have similar dimensions as the dimensions of the loading panel 800 of FIG. 8.

In the illustration of FIG. 9, and similar to the unloading panel 800 of FIG. 8, the back panel 900 may include a plain, impermeable portion 910. The plain, impermeable portion 910 may be made of the same material as the base portion 802 of the loading panel 800 of FIG. 8. In addition, the plain, impermeable portion 910 may include a number of handles 920. A respective number of fasteners 922 may attach the handle(s) 920 with the plain, impermeable portion 910.

Figure 10:
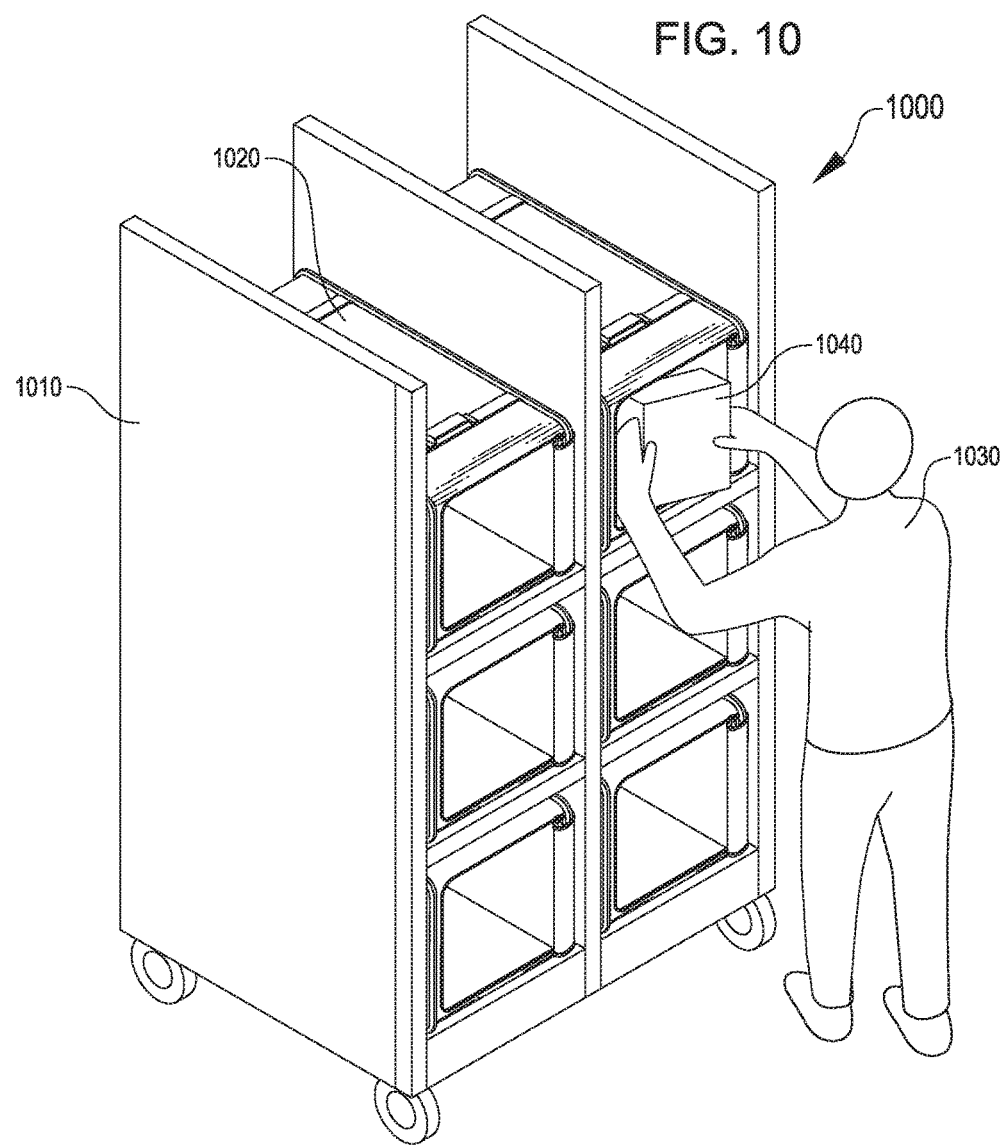
FIG. 10 illustrates an example operational environment where packaged items may be loaded into containers, according to embodiments of the present disclosure.

FIG. 10 illustrates an example operational environment 1000 where packaged items may be loaded into containers. In an example, the operational environment 1000 may include a rack 1010. The rack 1010 may be mobile or stationary. The rack 1010 may also include a number of compartments. Each compartment may have certain dimensions (e.g., height, length, and width). The dimensions may, but need not, be the same across the compartments. In an example, the dimensions of a compartment may facilitate placement of a container 1020 in an expanded state within the compartment. The dimensions may further support placement of an additional container in a collapsed state within the compartment. In other words, the dimensions may be larger than those of the container 1020 by a predefined margin. The margin may support the placement of the additional container. For example, the margin may vary between one half to five inches (1.27 to 12.7 cm). Hence, the dimensions of the compartment may fall within the range of ten and a half to twenty-five inches (26.67 to 63.5 cm) in height and depth and within the range of thirty and a half to fifty-five inches (77.47 to 139.7 cm) in length. Although FIG. 10 illustrates a single container per compartment, multiple containers may be placed back to back, or side to side, within the compartment. In an example of back to back placement, upon loading a container, that container may be removed and the next one in line may be accessed.

The container 1020 may be first placed in the compartment in a collapsed state and then transitioned to an expanded state. Additionally or alternatively, the container 1020 may be first transitioned to the expanded state and then placed inside the compartment. In both examples, an operator 1030 may place the container 1020. The operator 1030 may be a human operator or may be an automated, autonomous, or semi-autonomous operator such as a robotic arm. In addition, multiple containers, e.g., one in an expanded state and one or more others in a collapsed state, or each in a collapsed state, may be placed in the same compartment within the rack 1010 or another rack. These containers may be available to the operator 1030.

As illustrated in FIG. 10, once in the compartment, the operator 1030 (or a different operator) may open a loading panel of the container 1020, such that a re-sealable opening within the loading panel may be created. A respective loading flap may be wrapped around an exterior surface of the container 1020 and within the interior volume of the compartment. The operator 1030 may load a packaged item 1040 through the opening into an interior volume of the container 1020. Once one or more different packages are loaded into the container 1020 or the container 1020 has reached storage capacity, the operator 1030 (or another operator) may re-seal the opening of the container 1020, thereby retaining the packaged items within the container 1020. In addition, the operator 1030 (or another operator) may remove the container 1020 from the compartment and place the container 1020 in a delivery vehicle, in a bin, another rack, in a storage area and/or on a conveyor belt for further sorting and for ultimately being placed in the delivery vehicle.

Figure 11:
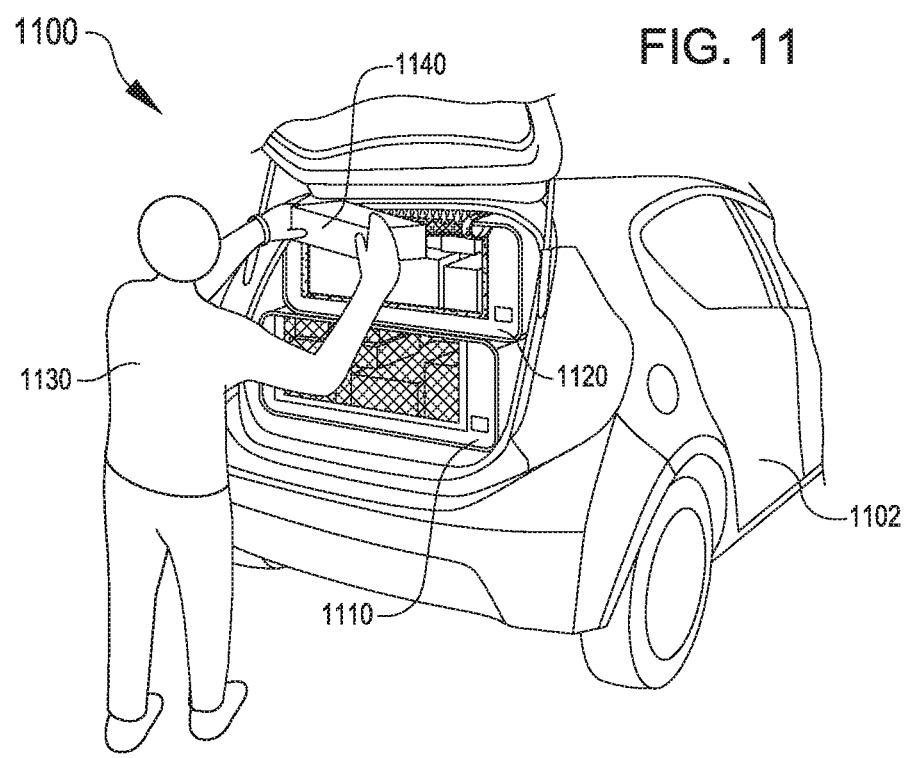
FIG. 11 illustrates an example operational environment where packaged items may be unloaded from containers, according to embodiments of the present disclosure.

FIG. 11 illustrates an example operational environment 1100 where packaged items may be unloaded from containers. In an example, the operational environment 1100 may include a delivery vehicle 1102. For instance, the delivery vehicle 1102 may be an economy car. Other delivery vehicles may also be possible, including terrestrial, aerial, and water-based delivery vehicles. Some of these delivery vehicles may be manually, autonomously, or semi-autonomously operated. Regardless of the delivery vehicle type, the delivery vehicle 1102 may include a storage space. A number of containers, each in an expanded state, may be loaded into the storage space and may include packaged items. FIG. 11 illustrates two containers 1110 and 1120 loaded in a trunk of an economy car, one on top of another. Other numbers of containers, storage spaces, and type of loading of containers in the delivery vehicle 1102 may also be possible. Accordingly, the containers may be dimensioned to fit within various possible storage spaces and to support various loading types with respect to the delivery vehicle 1102.

As illustrated in FIG. 11, an operator 1130 may unload packaged items from the container 1120 and, similarly, from other containers. The operator 1130 may be a human operator (e.g., a driver of an economy car) or may be an automated, autonomous, or semi-autonomous operator such as a robotic arm. In an example, prior to opening an unloading panel of container 1120 or other containers, the operator 1130 may visually identify a particular packaged item through a sealed, mesh portion of the unloading panel of container 1120 or other containers. Then, upon identifying the particular packaged item within container 1120, the operator 1130 may open an unloading panel of the container 1120, such that a re-sealable opening within the unloading panel may be created. A respective loading flap may be wrapped around an exterior surface of the container 1120 and within the interior volume of the storage space of the delivery vehicle 1102. The operator 1130 may unload a packaged item 1140 through the opening from the container 1120. After unloading the packaged item 1140, the operator 1130 (or another operator) may re-seal the opening and then deliver the packaged item to an end delivery destination. Once the container 1120 becomes empty, the operator 1130 (or another operator) may transition the container 1120 into a collapsed state. The collapsed container may be placed and secured in the same or different storage space of the delivery vehicle 1102 or of another vehicle. The process of unloading containers, delivering packaged items to end destinations, and collapsing empty containers may be repeated, e.g., until all packaged items in all containers have been delivered.

Referring to FIGS. 10 and 11, the rack 1010 and the vehicle 1102 may be a part of a delivery system of packaged items. The delivery system may implement a zone-based approach for sorting and delivering the packaged items. Under the zone-based approach, a geographical area may be divided into geographical zones. Each geographical zone may be sized such that a certain number (e.g., a maximum number) of packaged items may be destined to end destinations in the geographical zone. In an example, this number of packaged items may correspond to the capacity of a container. In other words, each container may be destined to a geographical zone and may contain all the packaged items destined to the end destinations in the geographical zone. An example delivery system implementing a zone-based approach is further described in U.S. patent application Ser. No. 14/868,682, filed Sep. 29, 2015, entitled "PLANNING OF TRANSPORTATION REQUESTS," the content of which is hereby incorporated herein by reference in its entirety.

Figure 12:
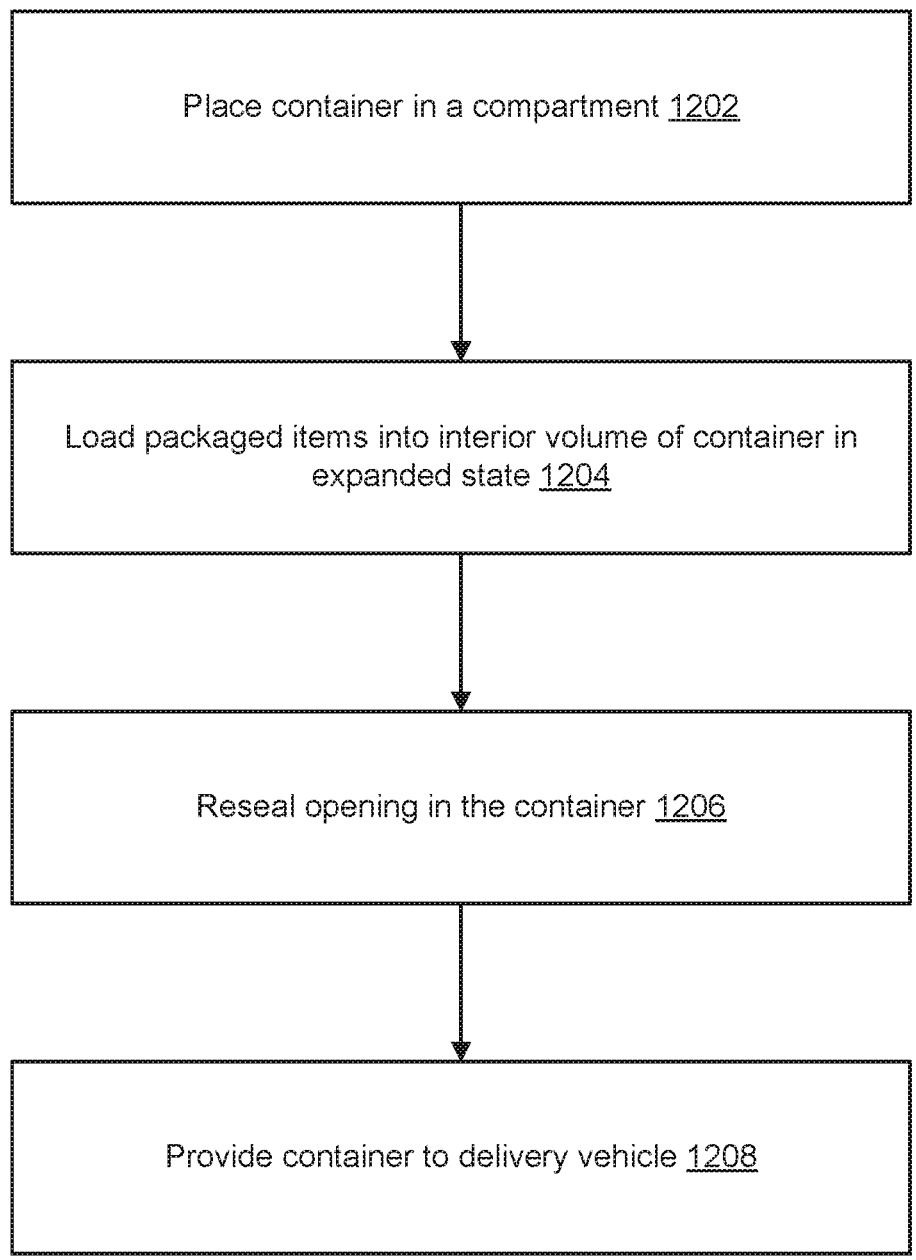
FIG. 12 illustrates an example flow for loading packaged items into an interior volume of a container, according to embodiments of the present disclosure.

FIG. 12 illustrates an example flow for loading packaged items into an interior volume of a container. In this example, the container may be placed in a compartment of a rack and items may be loaded into the interior volume through one of the panels of the container (e.g., through a loading panel).

As illustrated, the example flow may start at operation 1202, where the container may be placed in the compartment. For example, an operator may first transition the container to the expanded state by operating a folding member and different panels and then place the container into the compartment. In another example, the container may be placed in a collapsed state first in the compartment and then transitioned to the expanded state. In both examples, the container may be originally stowed or available from the compartment or from another compartment.

At operation 1204, packaged items may be loaded into the interior volume of the container in the expanded state. For example, the packaged items may be destined to a common zone within a geographic area and may be available from an item source, such as a conveyor belt or from holding bins. The operator may have access to a map or a list that identifies the packaged items and the zone. Accordingly, the operator may add or update a label of the container to identify the zone of the geographic area. In addition, the operator may operate a fastener and a loading flap of the container to create an opening. Thereafter, the operator may remove the packaged items from the item source and place the packaged items into the interior volume through the opening.

At operation 1206, the opening in the container may be resealed. For example, upon loading the different packaged items, the operator may further operate the fastener and the loading panel to close the opening.

At operation 1208, the container may be provided to a delivery vehicle. In an example, the operator may transfer the container to the delivery vehicle. In another example, the operator may move the container to a sortation area, place the container onto a conveyor belt, or leave the container within the compartment of the rack. Thereafter, different loaded containers may be sorted and transferred or ultimately delivered to respective delivery vehicles.

Figure 13:
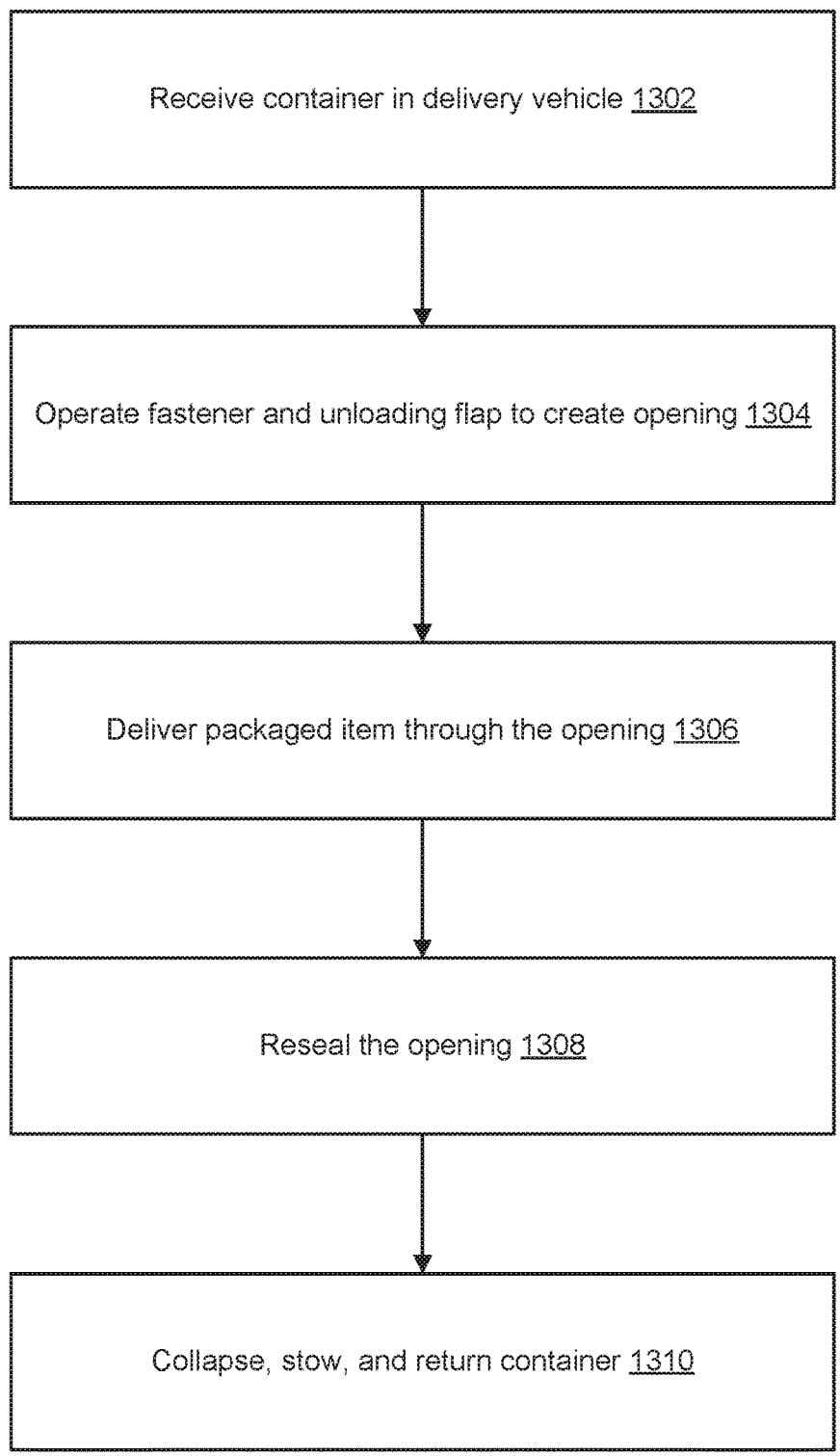
FIG. 13 illustrates an example flow for unloading packaged items from an interior volume of a container, according to embodiments of the present disclosure.

FIG. 13 illustrates an example flow for unloading packaged items from an interior volume of a container. In this example, the container may be placed in a stowage area of a delivery vehicle. The delivery vehicle may be operated to move to delivery destinations of the packaged items. Once at a delivery destination, the respective packaged item(s) may be unloaded from the container.

As illustrated, the example flow may start at operation 1302, where the container may be received in the delivery vehicle. The container may be in the expanded state and may contain the packaged items. In an example, an operator may operate the delivery vehicle to move to an area where the container may be available. Once at that area, the container may be transferred into the delivery vehicle. The transfer may be based on the geographic zone that the container is destined for and a commitment of the operator to operate the delivery vehicle according to a delivery route within that zone.

At operation 1304, a fastener and an unloading flap may be operated to create an opening. For example, upon arrival to a delivery destination of a packaged item, the operator may operate the fastener and the unloading flap to create the opening.

At operation 1306, the packaged item may be delivered through the opening. For example, the operator may remove the packaged item from the interior volume of the container through the opening for delivery at the delivery destination. At operation 1308, the opening may be resealed. For example, once the packaged item is removed from the interior volume, the operator may further operate the fastener and the unloading panel to close the opening. Operations 1304-1308 may be repeated across the different delivery destinations of the packaged items.

At operation 1310, the container may be collapsed, stowed, and returned. For example, upon delivery of the packaged items, the container may become empty. Accordingly, the delivery may be complete. The operator may operate a folding member and a number of panels of the container to transition the container to a collapsed state. The container may be stowed in the delivery vehicle in the collapsed state. In addition, the operator may return the container to the same area where the container was received or to another area.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

Unless otherwise stated, all measurements, values, ratings, positions, magnitudes, sizes, and other specifications that are set forth in this specification, including in the claims that follow, may be approximate, not exact. They may be intended to have a reasonable range that may be consistent with the functions to which they relate and with what is customary in the art to which they pertain. "About" may include within a tolerance of ±0.01%, ±0.1%, ±1%, ±2%, ±3%, ±4%, ±5%, ±8%, ±10%, ±15%, ±20%, ±25%, or as otherwise known in the art. "Substantially" may refer to more than 66%, 75%, 80%, 90%, 95%, 99%, 99.9% or, depending on the context within which the term substantially appears, value otherwise as known in the art.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A container comprising:
a plurality of panels forming boundaries of an interior volume of the container, the plurality of panels configurable to transition between a collapsed state and an expanded state, wherein the plurality of panels are dimensioned for facilitating stowage of the container in the collapsed state, for facilitating loading of packaged items into the interior volume in the expanded state when the container has been placed in a holding compartment, and for facilitating unloading of the packaged items from the interior volume in the expanded state when the container has been placed in a delivery vehicle, and wherein the plurality of panels comprise:
a loading panel comprising a first base portion, a loading flap and a zipper fastener that releasably attaches the loading flap with the first base portion, wherein the zipper fastener can be opened to expose an opening for the loading of the packaged items into the interior volume through the loading panel, and
an unloading panel comprising a second base portion, a hook and loop fastener, and an unloading flap that comprises a mesh portion, the hook and loop fastener releasably attaching the unloading flap with the second base portion, wherein the hook and loop fastener is detachable to release at least a portion of the unloading panel permitting the unloading of the packaged items from the interior volume through the unloading panel;
a first frame that surrounds the unloading panel;
a second frame that surrounds another panel of the plurality of panels opposite to the unloading panel, the second frame being opposite to the first frame; and
a folding member located within the interior volume and comprising a pad that is securely attached with one of the unloading panel or the other panel and that is releasably attached with the other one of the unloading panel or the other panel, wherein a first arrangement of the folding member relative to the first frame and the second frame permits transitioning the plurality of panels to the collapsed state, and wherein a second arrangement of the folding member relative to the first frame and the second frame constrains the plurality of panels from transitioning out of the expanded state.

2. The container of claim 1, wherein the loading panel and the unloading panel are adjoined along one edge, wherein the unloading panel comprises the first frame, wherein the unloading panel and the other panel are not collapsed in the collapsed state, wherein remaining panels of the plurality of panels are collapsed in the collapsed state, and wherein a distance in the collapsed state between the unloading panel and the other panel ranges between one to three inches.

3. The container of claim 1, wherein the container has a rectangular shape in the expanded state, wherein the other panel comprises a back-pack strap, wherein the loading panel is adjoined to the unloading panel and comprises a handle, and wherein another panel adjoined to the unloading panel, the other panel, and the loading panel comprises two handles.

4. The container of claim 1, wherein the loading panel has a square shape, wherein a height of the loading panel ranges between ten to twenty-five inches, wherein the unloading panel has a rectangular shape, wherein a height of the unloading panel ranges between ten to twenty-five inches, and wherein a length of the unloading panel ranges between thirty to fifty inches.

5. A method comprising:
placing a container in a holding compartment of a loading rack within a sortation facility, wherein the container comprises:
a plurality of panels forming boundaries of an interior volume of the container, the plurality of panels configurable to transition between a collapsed state and an expanded state, wherein the plurality of panels are dimensioned for facilitating stowage of the container in the collapsed state, for facilitating loading of packaged items into the interior volume in the expanded state based at least in part on the container being placed in the holding compartment, and wherein the plurality of panels comprise:
a first panel comprising a first base portion, a first fastener, and a first flap, wherein the first fastener releasably attaches the first flap with the first base portion, and wherein the first fastener can be operated to expose an opening for the loading of the packaged items into the interior volume through the first panel, and
a second panel comprising a second base portion, a second fastener, a second flap that comprises a mesh portion, wherein the second fastener releasably attaches the second flap with the second base portion, and wherein the second fastener is operated to release at least a portion of the second panel permitting unloading of the packaged items from the interior volume through the second panel;
a first frame that surrounds the second panel;
a second frame that surrounds a third panel opposite to the second panel, the second frame being opposite to the first frame; and
a folding member located within the interior volume and comprising a pad that is securely attached with one of the second panel or the third panel and that is releasably attached with the other one of the second panel or the third panel;
loading, in the expanded state, the packaged items into the interior volume through the opening in the first panel based at least in part on a first operation applied to the first fastener; and
re-sealing, in the expanded state, the opening in the first panel based at least in part on a second operation applied to the first fastener.

6. The method of claim 5, further comprising:
providing the container to a delivery vehicle, the providing comprising one or more of: transferring the container to a stowage space of the delivery vehicle, or transferring the container to an area and informing an operator of the delivery vehicle of an availability of the container from the area.

7. The method of claim 6, wherein upon arrival of the delivery vehicle to an end location associated with a packaged item loaded in the container, unloading the packaged item from the interior volume for delivery to the end location through the second panel by applying a third operation to the second fastener of the second panel.

8. The method of claim 7, wherein the packaged item is identified through the mesh portion of the second flap.

9. The method of claim 7, wherein a second opening in the second panel is created based at least in part on the third operation being applied to the second fastener, wherein the packaged item is unloaded through the second opening, and further comprising: re-sealing the second opening by applying a fourth operation to the second fastener.

10. The method of claim 7, further comprising:
transitioning the container to the collapsed state based at least in part on the packaged items being unloaded;
stowing the container in the collapsed state in the delivery vehicle; and
returning the container to the sortation facility.

11. The method of claim 5, wherein the first panel comprises a loading panel, wherein the second panel comprises an unloading panel, and
wherein a first arrangement of the folding member relative to the first frame permits transitioning the plurality of panels to the collapsed state, and wherein a second arrangement of the folding member relative to the first frame constrains the plurality of panels from transitioning out of the expanded state.

12. The method of claim 11, wherein an edge of the folding member is attached to the unloading panel within the interior volume, and wherein an opposite edge of the folding member is free and engages in the expanded state the third frame.

13. The method of claim 11, wherein placing the container in the holding compartment comprises:
retrieving the container in the collapsed state from the holding compartment or from another holding compartment;
applying an operation to the folding member such that the folding member is positioned according to the second arrangement; and
inserting the container in the expanded state in the holding compartment.

14. The method of claim 11, wherein placing the container in the holding compartment comprises:
accessing the container in the collapsed state in the holding compartment; and
based at least in part on the container being in the collapsed stated in the holding compartment, applying an operation to the folding member such that the folding member is positioned according to the second arrangement.

15. The method of claim 5, wherein the second flap has a rectangular shape, and wherein a length of the of the second flap ranges between twenty to forty-eight inches, and wherein a height of the second flap ranges between five to twenty-four and a half inches.

16. The method of claim 5, wherein the mesh portion extends to edges of the second flap and comprises a pattern of hexagonal holes, and wherein a maximum diagonal within a hexagonal hole ranges between one sixty-fourth to one inch.

17. The method of claim 5, wherein the container is placed in the holding compartment such that the first panel faces an outer surface of the holding compartment, wherein a height of the first panel ranges between ten to twenty-five inches, and wherein a height of the outer surface of the holding compartment ranges between ten and a half to twenty-five inches.

18. The method of claim 5, wherein the first panel comprises a first area configured to attach a first label, wherein the second base portion comprises a second area configured to attach a second label, and wherein each of the first label and the second label identifies a geographical zone to which the container is destined.

19. A method comprising:
placing a container in a holding compartment of a loading rack within a sortation facility, wherein the container comprises:
a plurality of panels forming boundaries of an interior volume of the container, the plurality of panels configurable to transition between a collapsed state and an expanded state, wherein the plurality of panels are dimensioned for facilitating stowage of the container in the collapsed state, for facilitating loading of packaged items into the interior volume in the expanded state based at least in part on the container being placed in the holding compartment, and wherein the plurality of panels comprise:
a loading panel comprising a first base portion, a first fastener, and a loading flap, wherein the first fastener releasably attaches the loading flap with the first base portion, and wherein the first fastener can be operated to expose an opening for the loading of the packaged items into the interior volume through the loading panel, and
an unloading panel comprising a second base portion, a second fastener, and an unloading flap that comprises a mesh portion, wherein the second fastener releasably attaches the unloading flap with the second base portion, and wherein the second fastener is operated to release at least a portion of the unloading panel permitting unloading of the packaged items from the interior volume through the unloading panel;
a first frame that surrounds the unloading panel;
a second frame that surrounds another panel opposite to the unloading panel, the second frame being opposite to the first frame; and
a folding member located within the interior volume and comprising a pad that is securely attached with one of the unloading panel or the other panel and that is releasably attached with the other one of the unloading panel or the other panel, wherein a first arrangement of the folding member relative to the frame permits transitioning the plurality of panels to the collapsed state, and wherein a second arrangement of the folding member relative to the frame constrains the plurality of panels from transitioning out of the expanded state;
loading, in the expanded state, the packaged items into the interior volume through the opening in the loading panel based at least in part on a first operation applied to the first fastener; and
re-sealing, in the expanded state, the opening in the loading panel based at least in part on a second operation applied to the first fastener.

20. The method of claim 19, further comprising:
providing the container to a delivery vehicle, wherein the packaged items are unloaded from the interior volume for delivery to end locations based at least in part through the unloading panel and on the container being placed in the delivery vehicle, and wherein a packaged item is identified through the mesh portion of the unloading flap and unloaded in part by applying an operation to the second fastener of the unloading panel.

* * * * *